(12) United States Patent
Lamartine et al.

(10) Patent No.: US 6,271,337 B1
(45) Date of Patent: Aug. 7, 2001

(54) PROCESS FOR THE PREPARATION OF CALIXARENES AND NEW CALIXARENE COMPOUNDS

(75) Inventors: Roger Lamartine, Villeurbanne; Isabelle Dumazet, Limony, both of (FR); Philippe Choquard, Cologny (CH); Arnold Marcillac, Saint-Sorlin-en-Bugey (FR); Francis Vocanson, Aurec (FR); Christian Duchamp, Bron (FR)

(73) Assignee: Fillger S.A. (CH)

( * ) Notice: Subject to any disclaimer, the term of this patent is extended or adjusted under 35 U.S.C. 154(b) by 0 days.

(21) Appl. No.: 09/168,661

(22) Filed: Oct. 8, 1998

Related U.S. Application Data (63) Continuation of application No. PCT/IB97/00357, filed on Apr. 7, 1997.

(51) Int. Cl.[7] .................................................. C08G 65/38
(52) U.S. Cl. ........................ 528/219; 568/716; 568/717
(58) Field of Search ................................... 568/716, 717, 568/219; 528/219

(56) References Cited

U.S. PATENT DOCUMENTS 4,098,717   7/1978   Buriks et al. ..................... 252/331

FOREIGN PATENT DOCUMENTS 0447977   9/1991   (EP) .
0514867   11/1992   (EP) .

OTHER PUBLICATIONS

Chemical Abstracts, vol. 95, No. 5, 1981, Abstract No. 42543w, Gutsche et al, "Calixarenes. 4. The Synthesis, Characterization, and PRoperties . . . ", p. 710.

Chemical Abstracts, vol. 97, No. 23, 1982, Abstract No. 197914h, Y. Nakamoto et al, "Formation of Cyclic Oligomers from p–tert–butylphenol . . . ", p. 550.

Chemical Abstracts, vol 97, No. 21, 1982, Abstract No. 181853b, A. Ninagawa et al, "Formaldehyde Polymers, 29, Isolation and Characterization . . . ", p. 773.

Chemical Abstracts, vol. 98, No. 5, 1983, Abstract No. 34357k, Y. Nakamoto et al, "Calix[7]arene from 4–tert–butylphenol and Formaldehyde", p. 629.

Chemical Abstracts, vol. 92, No. 1, 1980, Abstract No. 6185k, V. Boehmer et al, "A New Synthetic Access to Cyclic Oligonuclear Phenolic Compounds", p. 581.

Chemical Abstracts, vol. 92, No. 3, 1980, Abstract No. 22301a, C.D. Gutsche et al, "Calixarenes. II. The Isolation and Characterization of the Calix[4]arene . . . ", p. 665.

*Primary Examiner*—Edward J. Cain
(74) *Attorney, Agent, or Firm*—Ostrolenk, Faber, Gerb & Soffen, LLP

(57) ABSTRACT

A new two-step process for the preparation and industrial manufacture of calixarenes is disclosed. In the first step, linear phenolic oligomers are prepared in a basic medium from an optionally substituted phenol and a formaldehyde source. The reaction mixture is then neutralized or acidified, and cyclization of the oligomers is brought about at higher temperatures in the same reaction medium which is made water free and optionally completed by higher boiling liquids.

The process allows a definite control of the cyclic compounds to be synthesized.

Furthermore, novel calixarene compounds are disclosed as well as an installation for carrying out the process on a laboratory or industrial scale.

21 Claims, 7 Drawing Sheets

PROCESS FOR THE PREPARATION OF CALIXARENES AND NEW CALIXARENE COMPOUNDS

CROSS-REFERENCE TO RELATED APPLICATIONS

This is a continuing-application of International Application PCT/IB97/00357, with an International filing date of Apr. 7, 1997.

BACKGROUND OF THE INVENTION

1. Field of the Invention

The present invention is related to calixarenes and their preparation. More specifically, it is directed to a new and useful method for the preparation of known as well as of new calixarenes. The invention further aims at the new calixarenes obtained by the process of the invention.

Calixarenes are cyclic phenolic oligomers wherein two adjacent phenol rings are linked together by an ortho-ortho $CH_2$ bridge or an analogous homo $CH_2$ bridge. Some calixarenes have already been known, in particular the tetramers, hexamers and octamers as well as several calixarenes having an odd number of rings in their molecule. It seems that calixarenes having less than three phenolic rings are not accessible.

The calixarenes have found several applications in industry; they are for example used as starting materials for solid foams, as capturing agents for other, small molecules, as reactants for confining waste or dangerous solids, etc.

2. Description of the Prior Art

As it has already been mentioned above, some calixarenes are already known, see, e.g., the work of Gutsche et al. in Org. Syn. 1989, 68, 234; Niederl and Vogel in J. Am. Chem. Soc. 1990, 62, 2512, and Hogberg in J. Am. Chem. Soc. 1980, 102, 6046. p-Methylcalix[4]arene has already been synthesized in 1956 by a ten-step synthesis method using brominated intermediates. This methods has been taken over and developed in order to prepare linear phenolic oligomers which are then cyclized for yielding calixarenes having an even or odd number of phenolic rings, sometimes differently substituted, or asymmetric calixarenes (see, e.g., V. Böhmer et al., Makromol. Chem. 180, 2503–06 (1979), who however only discloses cyclic tetramers). Linear phenolic oligomers are at least two phenolic rings linked together in the ortho positions by a methylene group. In all cases, the syntheses are long-lasting and give very low yields only.

In 1981, a critical review of the two most common methods for synthesizing calixarenes has been published by C. D. Gutsche and co-workers in J. Am. Chem. Soc. 1981, 103, 3782–92. These two methods are a one-step method, called Munch method, and a three-step method, called Zinke method.

In the Munch method, a mixture containing p-tert-butylphenol, paraformaldehyde, and potassium hydroxide in an approximate ratio of 45:75:1 is heated during 4 hours in a xylene solution that is approximately 1.3 M in phenol, using a Dean and Stark trap to remove water. Typically, a colorless, xylene insoluble product is obtained in about 75% yield. This product contains linear phenolic oligomers and p-tert-butylcalix[8]arene (45%) whereas the 6- and 4-calixarene homologues can be isolated in small amounts (i.e. 9.5% and 9%, respectively) from the mother liquor.

The Zinke method comprises warming a mixture of the above mentioned starting materials during about 45 hours to 50–55° C. and then for about 2 hours to 110–120° C. Then, the reaction mixture is acidified, the separated solids are removed, and the washed and dried solids are heated for about 2 hours in a high-boiling liquid to about 210–220° C. This method principally yields cyclic tetramer and small amounts of hexamer and octamer. It has also been proposed by Gutsche, see the document cited in the preceding paragraph, to combine the first two steps of this method.

U.S. Pat. No. 4,098,717 discloses pre-formed phenolic compounds, substituted in one ortho position or in one ortho and in one meta position by a methylol group, as starting substances for a cyclization. The present invention does not use such starting compounds but para substituted phenols. Moreover, the reference clearly describes that a cyclization of these preformed phenolic formaldehyde derivatives under neutral conditions does not yield calixarenes but cyclic ethers, and that under mildly basic conditions, cyclic resins are formed, thus no calixarenes.

European patent application No. 0,447,977 discloses a method for the preparation of cyclic phenolic tetramers by heating a precondensate of p-alkylphenols and formaldehyde or an alkylcalix[8]arene together with an aqueous alkali metal hydroxide during about 1 to 10 hours at 217 to 257° C. in a hydrocarbon solvent. This variant of the Zinke method yields cyclic tetramer only in a yield of 50 to 60% only, and furthermore, the said precondensates are isolated prior to the final condensation.

Another one-step method for the synthesis of calixarenes and bishomooxacalixarenes, using a rather strongly basic medium, is disclosed in Chemical Abstracts 97, 1982, No. 197914h, without indicating reaction parameters such as temperature and duration. Furthermore, such a one-step method, using a basic medium too, is disclosed in Chemical Abstracts 92, 1980, No. 22301a where the presence of bishomooxacalix[4]arenes in the reaction product is mentioned.

Finally, attempts have been made to synthesize calixarenes comprising an odd number of rings in their molecule. Thus, A. Ninagawa suggests in Makromol. Chem., Rapid Commun. 3, 1982, 65–67 the isolation of the cyclic pentamer from the reaction product of the first two steps of a modified Zinke method. According to Y. Nakamoto [Makromol. Chem., Rapid Commun. 3, 705–07 (1982)], the heptamer was obtained in low yield from the solid reaction product of p-tert-butylphenol, paraformaldehyde and potassium hydroxide after refluxing this mixture for 30 hours in dioxane.

The methods of the prior art discussed above suffer from several severe drawbacks. No one of these methods can be used to prepare a desired calixarene in high yields on an industrial scale since on one hand, these known methods are either too time consuming and require a great number of separating, washing, drying and isolating operations, or they only give calixarenes in an industrially unsatisfactorily low yield, on the other hand, or both.

SUMMARY OF THE INVENTION

The first and major object of the present invention is to provide a universal method which allows the manufacture of any desired calixarene on an industrial scale. Another object is to provide such a method which is simple, comprises relatively few process steps, and gives satisfactory yields of calixarene. Further, still another object of the invention is to provide a method which permits the preparation of any desired calixarene by appropriately selecting the respective starting materials without undue changes in reaction conditions and parameters.

Still a further object of the invention is to provide a useful installation for the preparation of a great variety of calixarenes on a laboratory or an industrial scale. And still another object of the invention is to provide novel compounds of the calixarene family.

These objects are attained by the process of the invention which is a two-step process although both steps need not be performed in separate reaction vessels. The first step of the process comprises the synthesis of linear phenolic oligomers in a basic reaction medium, starting from a para substituted, ortho unsubstituted phenol source and a formaldehyde source, and the second step comprises the cyclization of these linear oligomers in a substantially water-free, neutral or acidic medium, the linear oligomers obtained in the first step not being isolated.

Basically, it will not be required to use another reaction medium when passing from the first to the second step; it will be sufficient to adapt the reaction medium used in the first step to the conditions required in the second step. For example, when the first step is conducted in an aqueous, a base containing medium without completely removing the water from it, the second step can be started after neutralization or, if desired, acidification and adding a desired solvent, typically an organic, higher boiling one that is preferably not miscible with water, and remaining water as well as reaction water will be removed during the operation by means of a well known Dean-Stark water trap. Neutralization or acidification may be effected before or after starting the second step of the process.

The linear phenolic oligomers obtained in the first step are generally not isolated from the reaction mixture for cyclization in the second step. However, it may sometimes be desirable to precipitate them from the reaction medium for purification or analysis purposes.

Typically, the first step is conducted at temperatures in the range of from 40 to 150° C., in most cases and when an aqueous medium is used, between 50 and 90° C. or at the boiling point of the medium. The second step is typically operated at temperatures well above 100° C. It is preferred to carry out the cyclization in using an organic liquid as a reaction medium such as toluene, xylenes, tetraline, petrol fractions of appropriate boiling range, diphenyl ether, etc. The liquid may be a solvent or not; its nature is not at all critical as far as it does not impair the cyclization. Sometimes, it is advantageous to use polar liquids such as dimethylsulfoxide, diethylformamide, etc. The liquid is selected to have a boiling point as high as desired for the reaction temperature so that the reaction can easily be carried out at reflux of the liquid. This allows an easy and substantially automatic control of the reaction temperature.

The second step of the process of the invention is carried out in the absence of water. Any water still present in the reaction mixture of the first process step, as well as water formed during the cyclization, is removed during the second step by distillation and decantation. Preferably, a Dean-Stark water trap is used for this purpose. In order to avoid the introduction of water into the reaction mixture when it is neutralized or acidified, it is preferred not to add an aqueous acid but to introduce dry hydrochloric acid in gas form into the mixture until the desired pH is reached, or to add dry HCl gas to the above mentioned liquid, until saturation if required. Sometimes, it is preferred to remove by distillation substantially all water from the reaction mixture resulting from the first step.

Starting materials for the process of this invention are the already known ones for the calixarene synthesis, namely a para substituted phenol. This para substituent is preferably an alkyl or aralkyl group such as methyl, ethyl, propyl, isopropyl, the butyls, tert-octyl, benzyl, etc. Specially preferred is tert-butyl. This substituent is before all, if it is not desired as such to be present in the final calixarene, a para protecting group in order to force oligomerization and cyclization reactions to occur in the ortho position(s) to the phenolic OH group. If not otherwise stated, the expressions "phenol" and "calixarene", as used in this document, refer to the para substituted species as defined just above.

The second starting material in the method of this invention is formaldehyde. Since the first step of the present process is often carried out in an aqueous medium, formalin or formol (an aqueous solution of formaldehyde at normally 37%) may be used. If it is desired to have a higher formaldehyde concentration in the reaction medium, paraformaldehyde may be used alone or together with formol. It will also possible to introduce gaseous formaldehyde into the reaction medium.

The first step of the process requires a basic medium. Thus, a base should be added. Suitable bases are NaOH and KOH. In some cases, other bases, alone or mixed with others, will be used, such as LiOH, CsOH, RbOH, $(CH_3)_3COK$, $[CH_3(CH_2)_3]_4NOH$ or still others. The proper choice of the base depend on the optimization of the reaction in terms of yield and selectivity.

During the first step of the present process, linear phenolic oligomers are formed. Generally, a mixture is obtained containing oligomers comprising between 2 and 6 monomeric phenolic units and still momomeric phenol. The number of phenolic units in the oligomer is generally influenced by reaction conditions such as temperature, duration, relative concentration of the reactants, the nature and sometimes the amount of the base used. Typically, the chain of the oligomers will become longer when the reaction time is increased and also the formaldehyde-phenol ratio. The yield and the nature of the oligomers can be influenced when the reaction temperature is increased, in particular above 100° C.

The reactions that occur during the second step of the present process are also already known per se. However, it has quite surprisingly been found that, when monomeric phenol or another oligomer than that contained in the reaction mixture and, optionally, formaldehyde is added to the starting mixture for the second step, a calixarene having an odd number of phenolic units in the cycle, a calixarene having more than 8 units in the cycle, and/or even an asymmetric calixarene can be obtained. All these compounds have only been, at most, minor by-products of the known cyclization reactions, or were even completely unknown.

The attached drawing shows reaction diagrams being at the base of the present process, and further schematically the different synthesis possibilities. An installation for carrying out the process of the invention is also shown.

DETAILED DESCRIPTION OF THE INVENTION

According to the experimental conditions which are used, different combinations, organizations and reactions between linear oligomers are possible in the process of this invention. Thus, certain calixarenes are formed during the cyclization of a sole linear oligomer (pseudocalixarene route) whereas others result from the combination of two identical or different linear oligomers (hemicalixarene route), as shown in the following diagrams.

Figure 1A:
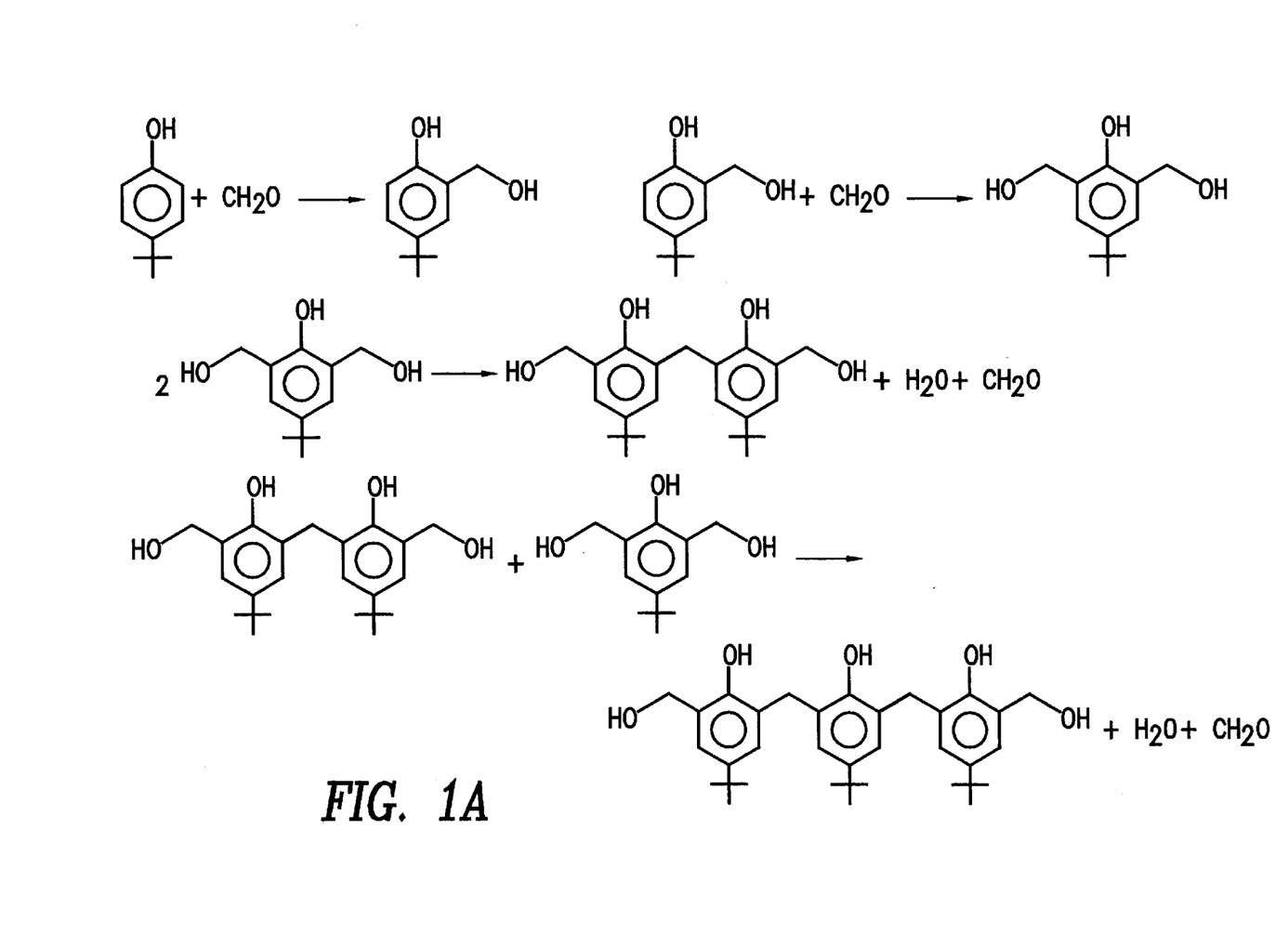
FIGS. 1A and 1B are reaction diagrams showing the formation mechanism of p-tert-butylcalix[6]arene starting from linear oligomers.
Figure 1B:
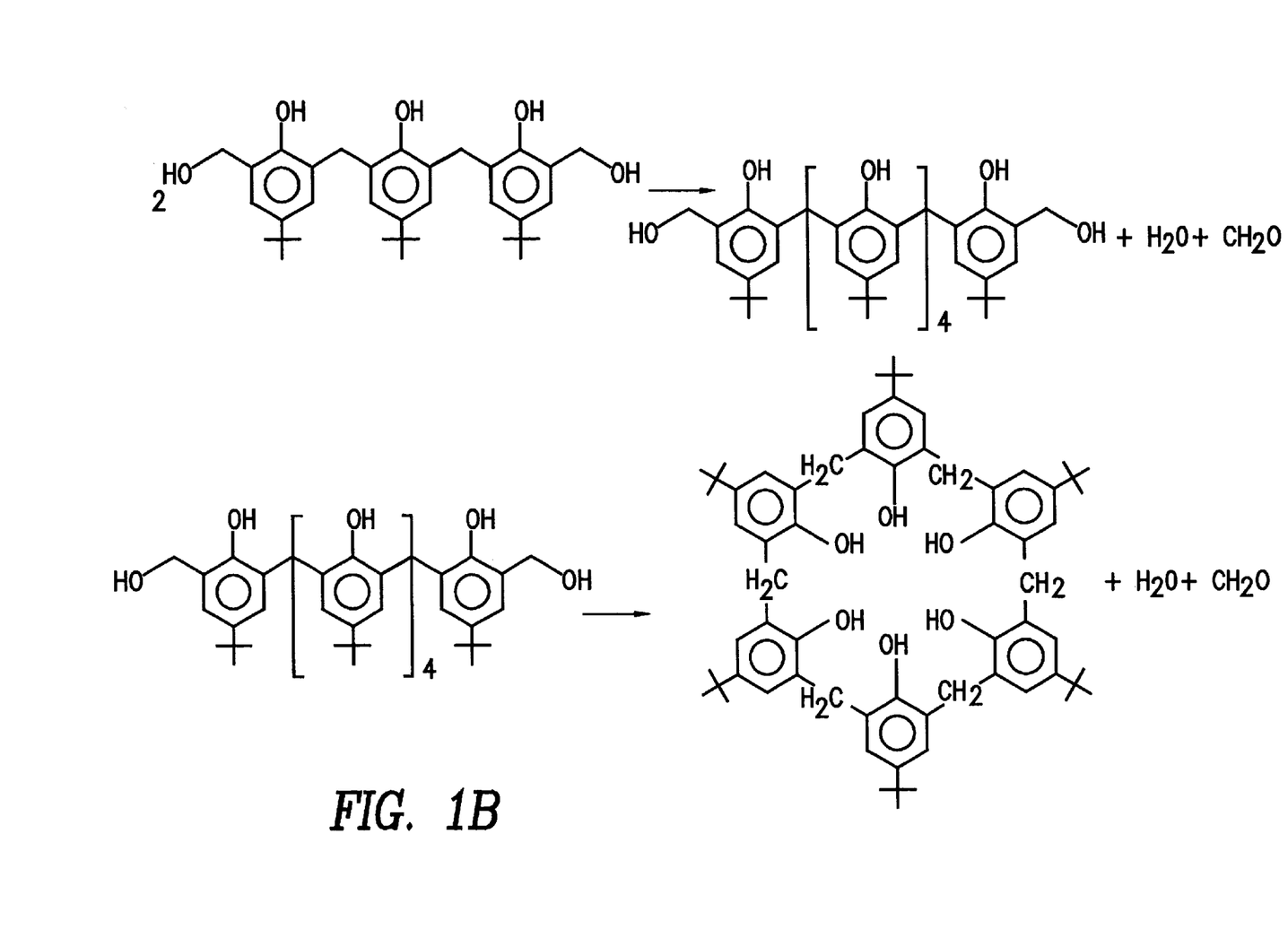
Figure 2A:
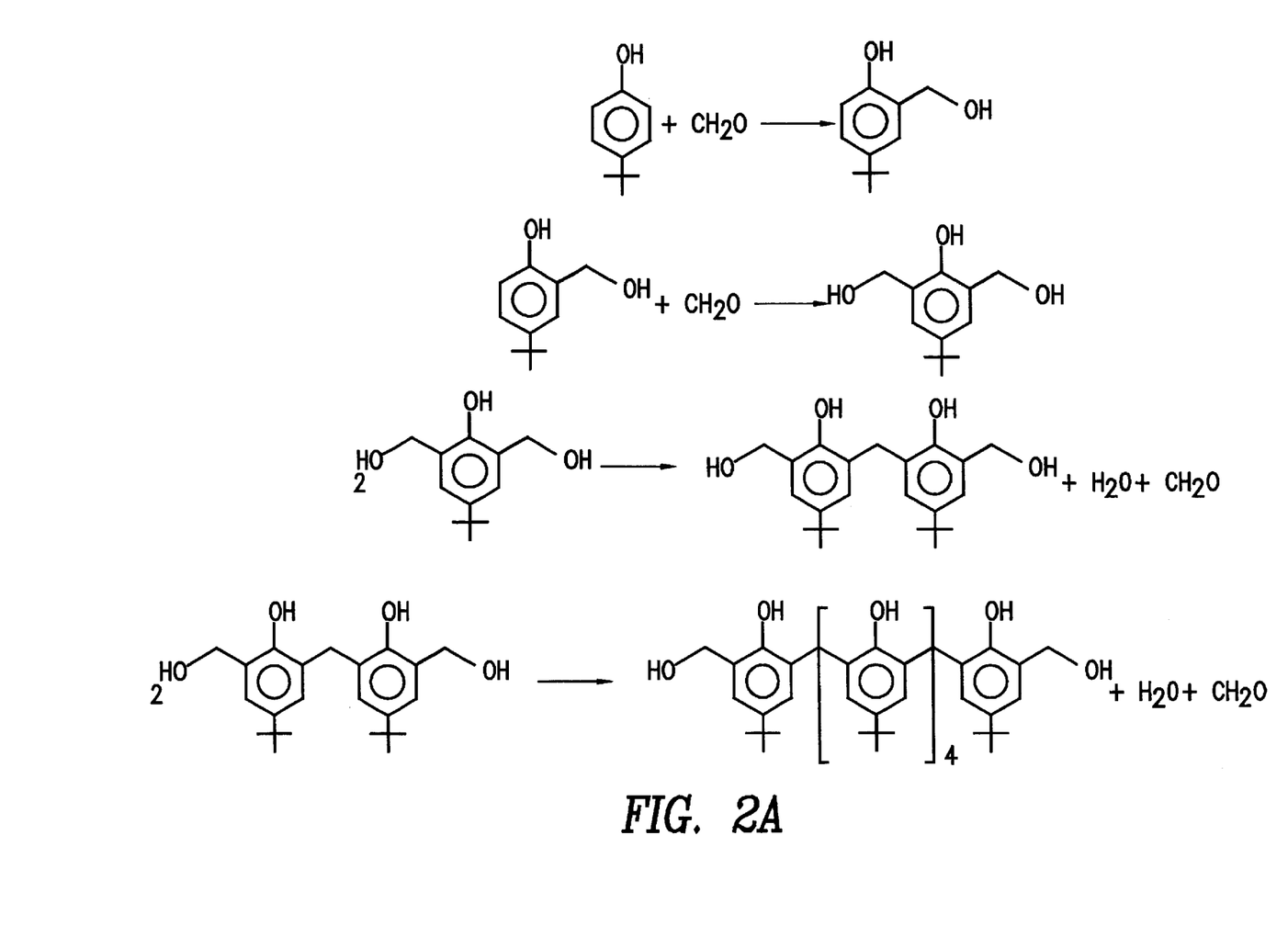
FIGS. 2A and 2B are reaction diagrams showing the formation mechanism of p-tert-butylcalix[8]arene starting from linear oligomers.
Figure 2B:
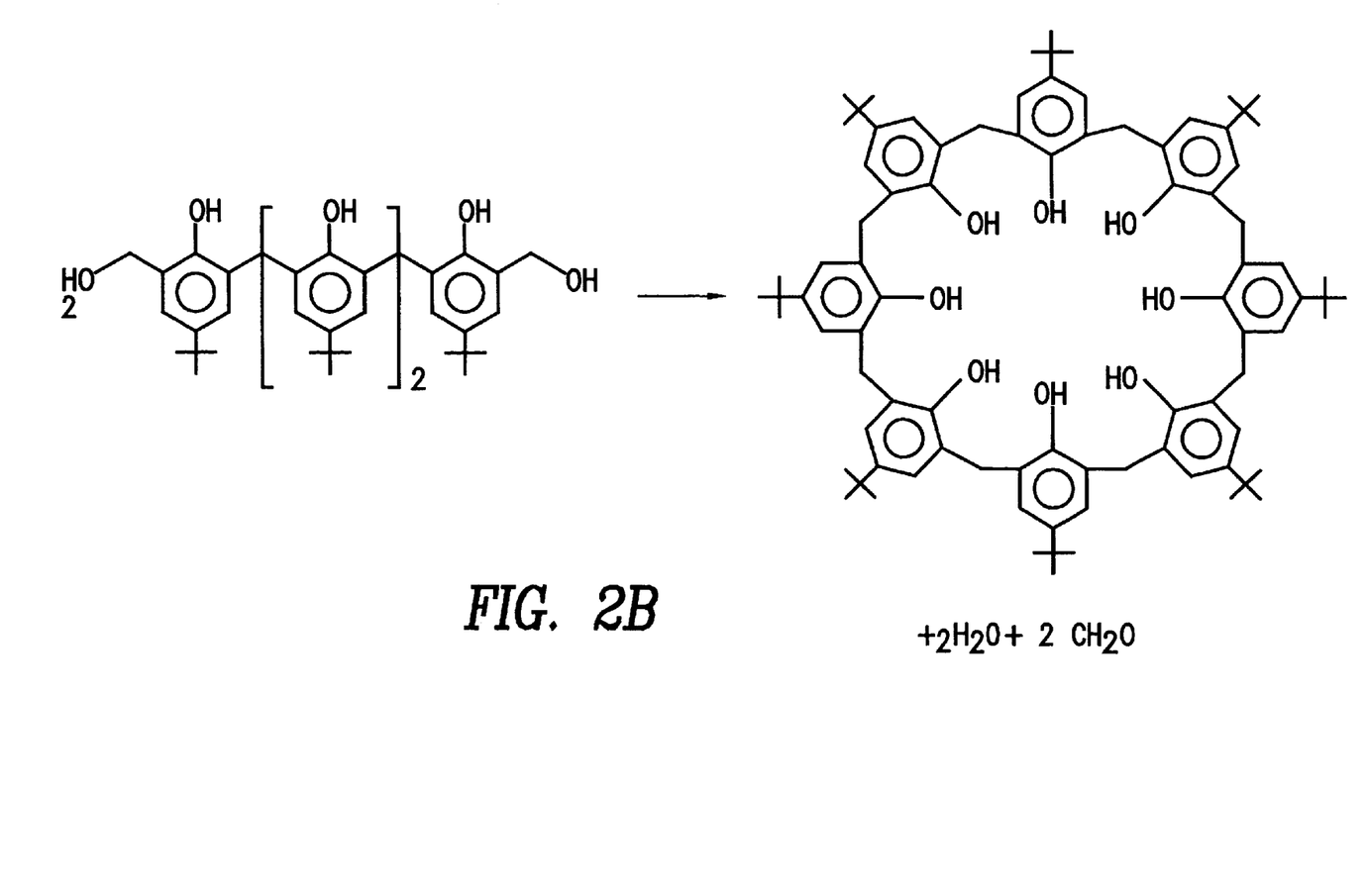

A) p-tert-Butylcalix[6]arene, pseudocalixarene route:

pseudocalix[6]arene p-tert-butylcalix[6]arene b) p-tert-Butylcalix[8]arene, hemicalixarene route:

hemicalix[8]arene p-tert-butylcalix[6]arene

The diagrams shown in FIGS. 1A, 1B, 2A and 2B do not need any detailed explanation; it can easily be seen how a linear oligomer is first be formed which is then cyclized, see the last line of the diagrams. In FIGS. 1A, 1B, this cyclization runs the pseudocalixarene route whereas in FIGS. 2A, 2B, the cyclization follows the hemicalixarene route.

Figure 3:
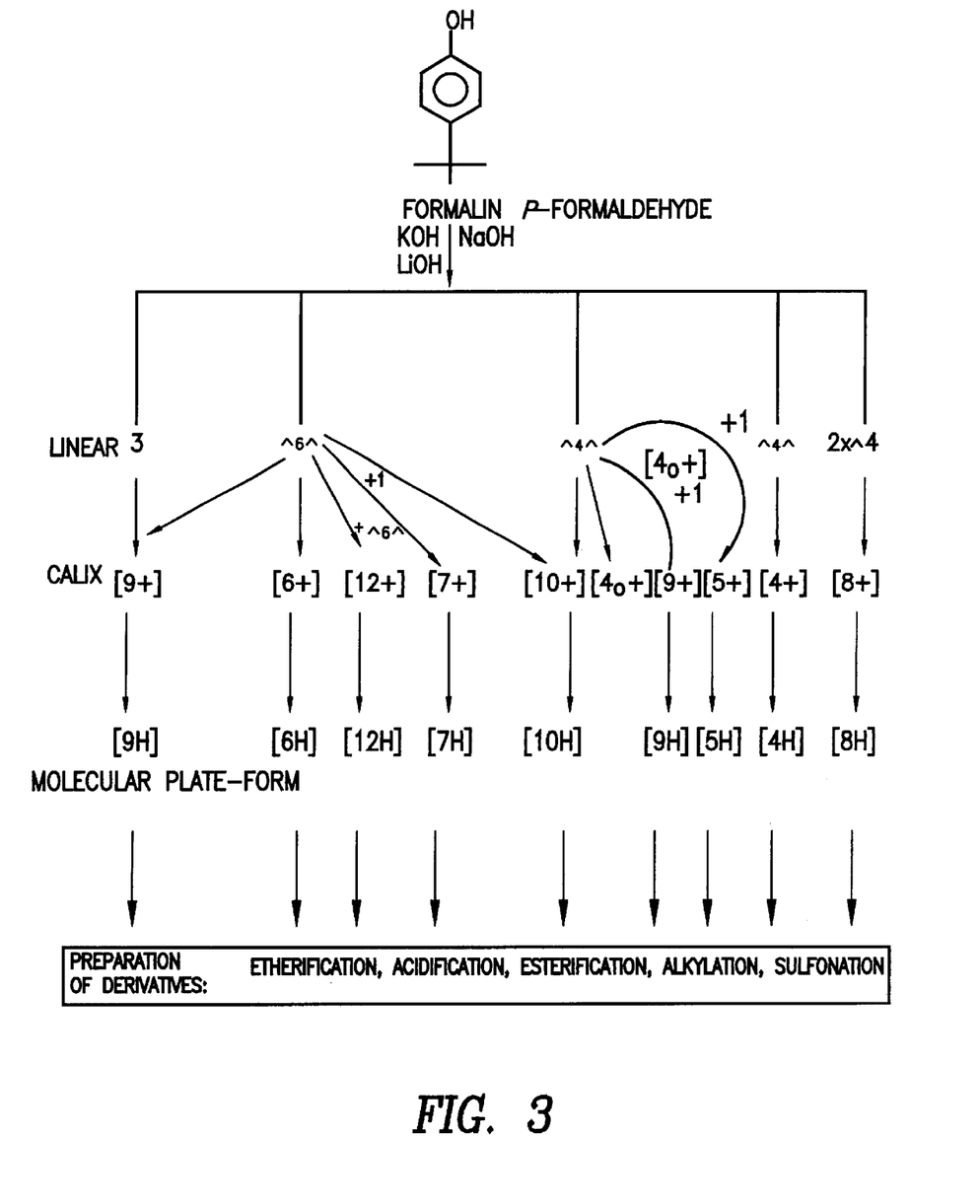
FIG. 3 is an overview showing some possibilities of the syntheses when using the process of the invention.

FIG. 3 shows some examples of the possibilities of the syntheses and preparations disclosed herein; this diagram is by no way exhaustive. Starting from a para substituted phenol and a formaldehyde source, different linear oligomers can be prepared. Following the two routes described above, a great variety of calixarenes can be synthesized by cyclization from identical or different linear oligomers, with optional addition of monomeric phenolic compounds.

Figure 4:
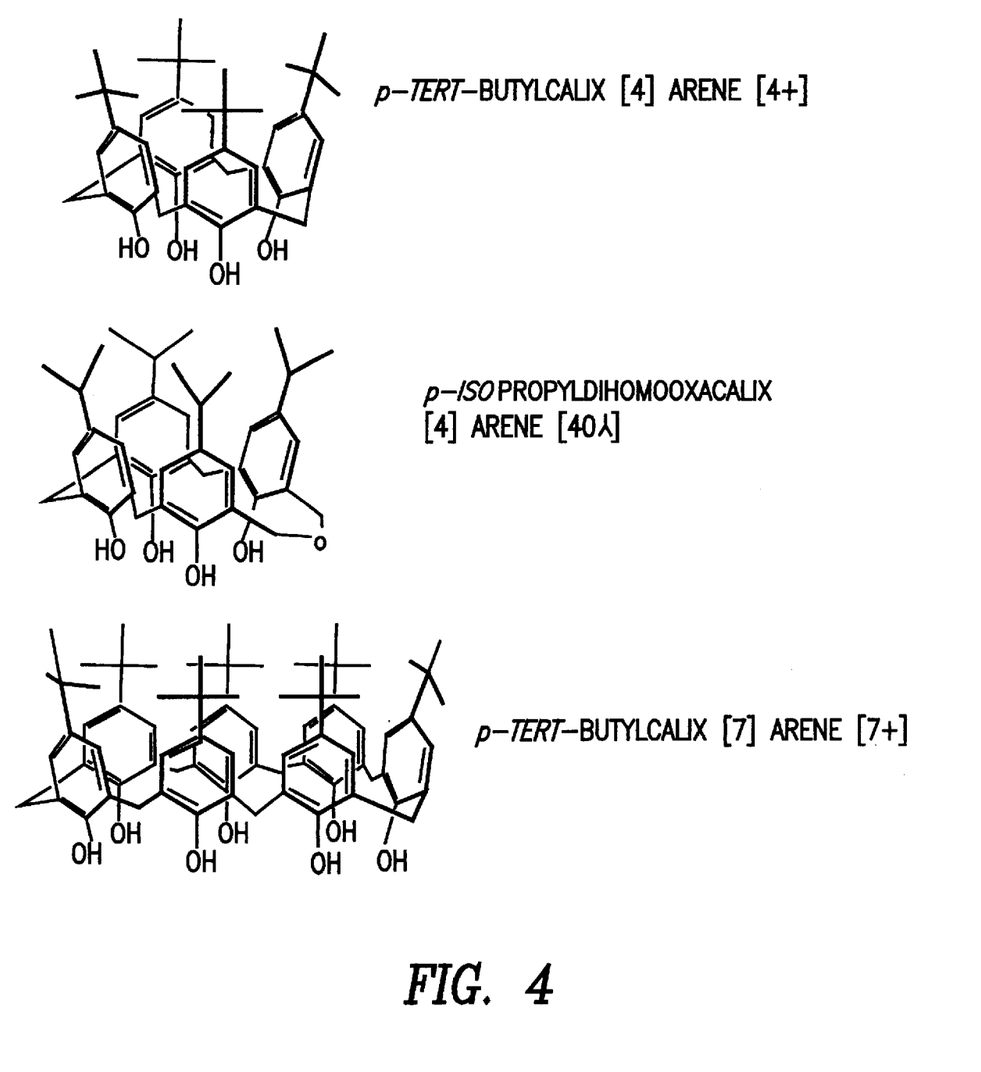
FIG. 4 shows, as an Example, some structural formulae of the calixarenes to be prepared.

FIG. 4 shows as an example the structural formula of three calixarene compounds that can be prepared according to the process of the present invention, together with their systemic nomenclature.

The abbreviations that are used in FIG. 3 and FIG. 4 and in the following description are the following:
  1 p-tert-butylphenol ("monomer"), optional substituted in meta position to the OH group
  1^ o-hydroxymethyl-p-tert-butylphenol ("hydroxymethyl monomer")
  ^1^ "o,o-dihydroxymethyl monomer"
  2 o,o'-methylene-p,p'-di-tert-butyldiphenol ("dimer")
  2^ o,o'-methylene-o-hydroxymethyl-p,p'-di-tert-butyldiphenol ("hydroxymethyl dimer")
  ^2^ o,o'-methylene-o,o'-dihydroxymethyl-p,p'-di-tert-butyldiphenol ("dihydroxymethyl dimer"), etc.
  4+ p-tert-butylcalix[4]arene
  4O+ p-tert-butyldihomooxacalix[4]arene
  4Oλ p-isopropyldihomooxacalix[4]arene
  nH calix[n]arene, unsubstituted in para position
  Generally: digit=number of phenolic units; H=para unsubstituted; ^=hydroxymethyl; +=p-tert-butyl; λ=p-isopropyl; O=dihomooxa The diagram of FIG. 3 is not limitative nor exhaustive since, for example, the p-tert-butyl substituent shown may be replaced by any other one, e.g. isopropyl, and the diagram does not contain all possible reactions or products which can be prepared. The diagram rather shows that the present invention provides a process for the controlled and basically selective synthesis of any desired particular calixarene compound.

As it has already been stated above in part, the present invention provides also novel compounds. All oligomers and calixarenes that are para substituted by an isopropyl group have not yet been described. Most asymmetric calixarenes are also new compounds. Furthermore, all calixarenes comprising more than 8 phenolic units in their molecule are new compounds, be they even or odd calixarenes.

Figure 5:
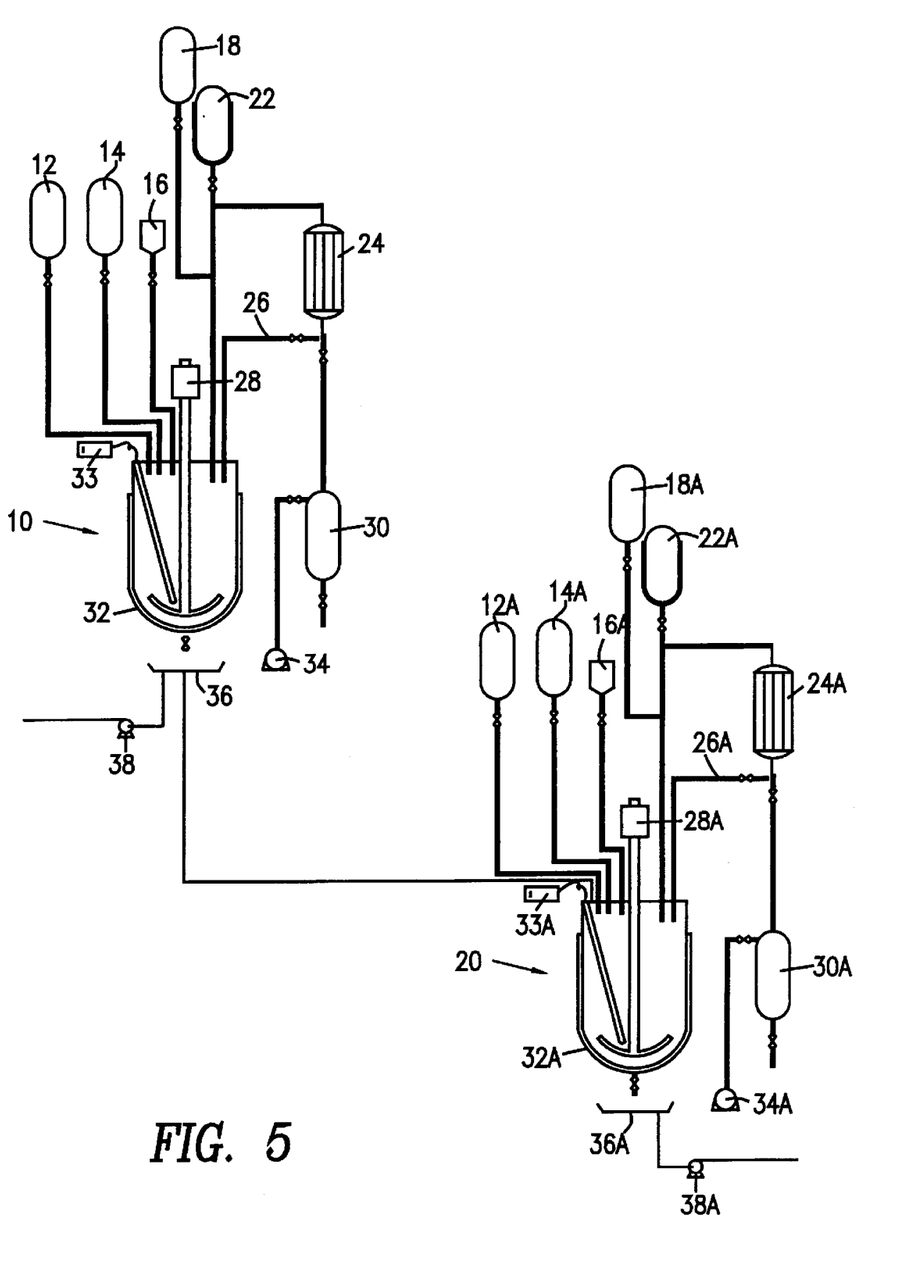
FIG. 5 schematically shows an installation for carrying out the process of the present invention.

FIG. 5 schematically shows an installation allowing the realization of the process of this invention. Of course, the dimensions of the individual parts of the installation may vary in order to adapt it to a preparation on a laboratory scale, an intermediate scale, or an industrial process.

The installation comprises two substantially identical reaction units 10 and 20. In unit 20, the parts bearing a reference numeral where an "A" has been added, are similar or identical to the corresponding parts of unit 10 and are described together.

Each reaction unit 10; 20 comprises a reactor 32; 32A, respectively, having a double shell for heating and cooling by circulating an appropriate heat transfer fluid. The reactors 32, 32A are equipped with a temperature measuring and recording device 33; 33A, a storage tank 12; 12A for the phenol(s) and/or the precursors, a formol storage vessel 14; 14A, a catalyst storage vessel 16; 16A, a storage tank with preheating means 22; 22A for solvents, and a reservoir 18; 18A for inert gas. Further, reactors 32; 32A are equipped with a motor driven stirring device 28; 28A and a Dean-Stark system for water removal; this system comprises a condenser 24; 24A connected by a pipe 26; 26A to the reactor 32; 32A, and by another conduit to a receptacle for condensed water 30; 30A.

The reactors 32; 32A can be emptied into a collecting basin 36; 36A. A pump 38; 38A is provided for sending the product from the collecting basin 36A to a purification equipment (not shown) or to other post-treatment stages. Finally, the first collecting basin 36 has a conduit 37 that leads to the second reactor 32A.

The functioning of the installation is quite evident and will further be explained in the following Examples which illustrate and explain the invention in more detail but which are not to be understood to limit the invention in any way.

EXAMPLE 1

A. Synthesis of the linear dihydroxymethylated (^4^) and monohydroxymethylated (^4) tetramer The reactor 32 of part 10 of the installation (see FIG. 5), is charged with 20 g (0.133 mole) of p-tert-butylphenol, 12.4 ml (0.166 mole) of 37% formol, and 0.24 g (0.006 mole) of solid 98% NaOH. The reaction mixture is heated to 110° C. under stirring for 2 hours, finally yielding a viscous mass containing about 40% of linear phenolic tetramers, namely the compounds 4^ and ^4^, the remainder being dimers and the monomer.

B. Synthesis of p-tert-butylcalix[4]arene (4+)

The reaction mixture obtained in Example 1A above is transferred into reactor 32A of installation part 20. Dry HCl gas is pearled through the mixture until neutrality. Then, 200 ml of hot diphenyl ether are added under stirring. The reaction mixture is heated to reflux for about 2 hours. After cooling, allowing a precipitate to form, addition of ethyl acetate, filtering, washing, dissolution in toluene and concentration, virtually pure p-tert-butylcalix[4]arene is obtained in a 49% yield.

EXAMPLE 2

A. Synthesis of the linear dihydroxymethylated hexamer (^6^)

The reactor 32 of part 10 of the installation (see FIG. 5), is charged with 20 g (0.133 mole) of p-tert-butylphenol, 27 ml (0.36 mole) of 37% formol, and 3 g (0.045 mole) of 84% KOH pastilles. This mixture is heated under stirring until the formation of a dry mass.

A sample thereof is dissolved in cold $CHCl_3$, and the solution is neutralized with concentrated hydrochloric acid. After evaporation to dryness and analysis, it is found that the above reaction has given the ^6^ compound with a yield of 80 to 90%.

B. Synthesis of p-tert-butylcalix[6]arene (6+)

The yellow dry residue in reactor 32, obtained in Example 2A, is treated with ortho-xylene, and the suspension obtained is transferred after neutralization into reactor 32A. The reaction mixture is refluxed for 3 hours while stirring and is filtered after cooling. The solid obtained on the filter is dissolved in chloroform, then treated by hydrochloric acid, and the organic layer is concentrated to 200 ml. 200 ml of hot acetone are added. After cooling and filtration, p-tert-butylcalix[6]arene is recovered in a 80 to 90% yield.

EXAMPLE 3

Synthesis of p-tert-butylcalix[7]arene (7+)

In this Example, the cyclization is effected as a second stage immediately after the oligomerization in the same reactor.

First, the dihydroxymethylated linear oligomer ^6^ is prepared in reactor 32. This reactor is charged with 10 g (66.5 mmole) of p-tert-butylphenol, 18.83 ml (250.6 mmole) of 37% formol, and 0.63 g (15 mmole) of $LiOH.H_2O$ under stirring. This mixture is heated, the water is removed in the Dean-Stark trap 24 and 30, and a solid yellow dry crust is obtained comprising linear oligomer.

The subsequent cyclization step is carried out in the same reactor 32 in the presence of an additional monomer. A solution of 1.792 g (11.95 mmole) of p-tert-butylphenol in 25 ml xylene is added to the crust in the reactor 32; then, 75 ml of more xylene, saturated with dry gaseous HCl, are added. This reaction mixture is refluxed for 3 hours. After purification, p-tert-butylcalix[7]arene is recovered in an 11% yield.

EXAMPLE 4

(para dealkylation)

Synthesis of calix[6]arene (6H)

This Example illustrates the preparation of an unsubstituted calixarene by dealkylation.

1.46 g (1.5 mmole) of p-tert-butylcalix[6]arene, obtained e.g. according Example 2, 0.84 g (8.93 mmole) of phenol, 1.68 g (12.53 mmole) of $AlCl_3$, and 22 ml of toluene are mixed in reactor 32 in a nitrogen atmosphere. The mixture is stirred at room temperature for 4 hours, and 32 ml of 3N HCl are the added to the reaction mixture which is then transferred into reactor 32A. After another 2 hours of stirring, the mixture is filtered and the residue is washed and dried. After recrystallization, calix[6]arene is obtained in an 80% yield.

EXAMPLE 5

Preparation of p-isopropyldihomooxacalix[4]arene (4Oƛ)

This Example describes the synthesis of a compound of the p-isopropyl family and of a new calixarene.

In reactor 32, 29.92 g (0.22 mole) of p-isopropylphenol, 19.8 g (0.66 mole) of p-formaldehyde, and 150 ml of tetraline are mixed together. 0.2 ml (0.026 mole) of 13N KOH are added. The mixture is a suspension which is vigorously stirred and heated to 150° C. After 15 minutes at this temperature, the mixture becomes homogenous. Gaseous, dry HCl is introduced until neutrality, and the mixture is held for 2 hours at 150° C. under stirring. The mixture is then transferred into reactor 32A. After cooling down and filtering, the mother liquors are concentrated. The addition of methanol provokes a white precipitate which allows, after filtration, the recovery of p-isopropyldihomooxacalix[4]arene, m.p. 324–325° C., in a 16% yield.

EXAMPLE 6

Preparation of p-tert-butyldihomooxacalix[4]arene (4O+)

This Example illustrates the preparation of a homooxacalixarene, useful as intermediate for the preparation of odd or higher calixarenes.

The following materials are blended in reactor 32: 33.33 g (0.22 mole) of p-tert-butylphenol, 11.67 g (0.389 mole) of p-formaldehyde, and 200 ml of xylene. After 20 minutes of stirring, 0.667 ml (0.0667 mole) of 10N NaOH is added. The reaction mixture is refluxed for 45 minutes under stirring, then transferred into reactor 32A, cooled and filtered. The filtered mixture is left standing at 10° C. for 2 to 3 days. After filtration and recrystallization, the p-tert-butyldihomooxacalix[4]arene is recovered in a 24% yield.

EXAMPLE 7

Preparation of p-tert-butylcalix[5]arene (5+)

In this Example, a linear oligomer (4) is combined with a monomer, and the combination is cyclized. The linear (4) is obtained in opening the ring of compound 4O+ obtained by the method of Example 6. All reactions take place in the same reaction medium.

1.6 g (2.35 mmole) of p-tert-butyldihomooxacalix[4]arene, 0.354 g (2.35 mmole) of p-tert-butylphenol, and 30 ml of tetraline are mixed under stirring in reactor 32. The reaction mixture is heated to 180–190° C. and, when it have become transparent, 100 μl (0.4 mmol) of KOH are added. The reaction mixture is refluxed at 200° C. during 1 hour. It is then rapidly transferred into reactor 32A, the mixture is neutralized with HCl gas, and then refluxed for another 4 hours. After evaporation to dryness in vacuo and recrystallization of the residue, p-tert-butylcalix[5]arene is obtained in a 20% yield.

EXAMPLE 8

Preparation of an Asymmetric Calixarene

The process of this invention allows for the first time a simple preparation, without exchanging side chain substituents as described by Boehmer et al. (see above), of asymmetric calixarenes, i.e. calixarenes wherein the ring members are not identical, in fairly good yields.

Example 7 is repeated with the exception that, for making an asymmetric calix[5]arene, the 2.35 mmoles of p-tert-butylphenol added to the linear-4 oligomer, are replaced by equivalent amounts of other monomers unsubstituted in para position or substituted by another group than tert-butyl.

After evaporation of the solvent, neutralization and recrystallization from the reaction mixture, the respective asymmetric calix[5]arene is recovered in a 5 to 15% yield.

EXAMPLE 9

Preparation of p-tert-butylcalix[9]arene (9+)

This Example illustrates the preparation of another odd calixarene by combining the dihydroxymethylated linear hexamer with the linear trimer.

A. Preparation of the Linear Trimer 100 g (0.66 mole) of p-tert-butylphenol and 33.33 ml (0.333 mole) of 10N NaOH are charged into reactor 32. The mixture is warmed for 1 hour to 50° C. Then, 148.5 ml (1.98 mole) of 37% formol are portionwise added. The mixture is heated for 90 minutes to 90° C. Xylene and more p-tert-butylphenol (399 g, 2.66 mole) are added, and the mixture is refluxed for 3 hours. The mixture is acidified by adding 3.33 ml (0.0266 mole) of concentrated HCl. A sample, recrystallized from a mixture of benzene and acetone, shows that the mixture contains the linear trimer in a 65% yield.

B. Preparation of p-tert-butylcalix[9]arene (9+)

In reactor 32A, 0.025 mole of the dihydroxymethylated linear hexamer (^6^) are prepared according to the method of Example 2A as a suspension in xylene. Then, a portion of the mixture in reactor 32, obtained according to part A of this Example and corresponding to 0.025 mole of the trimer, is transferred into reactor 32A. The reaction mixture, containing 200 ml of xylene, is refluxed during 3 hours for cyclization. After purification, 5% of p-tert-butylcalix[9]arene are obtained, m.p. 297–300° C., molecular mass 1460, $\epsilon_{max}$=24420 in the UV spectrum, giving the following elemental analysis:

|   | calc. | found |
|---|---|---|
| C | 80.98 | 81.22 |
| H | 9.20  | 8.76  |
| O | 9.82  | 9.98  |

EXAMPLE 10

By using the techniques of the preceding Examples, p-tert-butylcalix[10]arene has been prepared. This compound is obtained by a cyclization of corresponding linear oligomers, e.g. starting from a mixture of the oligomers ^6^ and ^4^, or passing through the intermediate which forms when the linear oligomer ^4^ is reacted with formaldehyde and phenol.

The compound which has been obtained has a melting point of 300–305° C., a molecular mass of 1621, and an $\epsilon_{max}$ of 44570 in the UV spectrum. The elemental analysis is C, 80.98; H, 8.77; and O, 10.00.

EXAMPLE 11

Using the techniques described in the preceding Examples, each comprising the preparation of oligomers in a basic, aqueous medium and their cyclization in a neutral or acidic, water-free medium, the p-tert-butylcalix[11, 12, 13 and 14]arenes have been prepared. A mixture of these calixarenes is obtained starting from the oligomers ^6^ and 3 which, by disruption and recombination, yield cyclic structures comprising 11, 12, 13 and 14 phenolic units. The reaction mixture is treated on a silica column with chloroform/hexane. The fractions are recrystallized from a chloroform/acetonitrile mixture, and each of the 11, 12, 13 and 14 calixarenes is obtained in crystallized form. The physical properties are the following:

|     | M.P., ° C. | Elemental analysis | | | molecular mass (negative electrospray) |
|-----|---|---|---|---|---|
|     |   | C | H | O |   |
| 11+ | 383–384 | 81.02 | 8.83 | 9.94 | 1784 |
| 12+ | >400 | 80.92 | 9.02 | 9.90 | 1947 |
| 13+ | >400 | 80.94 | 9.07 | 9.93 | 2109 |
| 14+ | 350 | 81.17 | 8.81 | 9.76 | 2271 |

EXAMPLE 12

Several p-isopropylcalixarenes have been prepared by repeating the previous Examples, in particular Examples 1 and 2, with the exception that the starting p-tert-butylphenol has been replaced by the corresponding molar amount of p-isopropylphenol.

The following results have been obtained after the isolation of different isopropylcalixarenes from the reaction mixture by chromatography:

A) p-Isopropylcalix[4]arene (4λ)

This compound has been recovered in a 19% yield as a pure, crystalline powder, m.p. 291–293° C., molecular mass 592 (FAB+); $R_f$=0.60 eluted by chloroform/hexane 1:1.

Elemental analysis:

|   | calc. | found |
|---|---|---|
| C | 81.04 | 80.91 |
| H | 8.17 | 8.16 |
| O | 10.79 | 10.83 |

B) p-Isopropylcalix[6]arene (6λ)

This compound has been recovered in a 55% yield as a pure, crystalline powder, m.p. 348–351° C., molecular mass 888 (FAB+); $R_f$=0.67 eluted by chloroform/hexane 1:1.

Elemental analysis:

|   | calc. | found |
|---|---|---|
| C | 81.04 | 81.16 |
| H | 8.17 | 8.24 |
| O | 10.79 | 11.03 |

C) p-Isopropylcalix[8]arene (8λ)

This compound has been recovered in a 32% yield as a pure, crystalline powder, m.p. 368–371° C., molecular mass 1184.6 (FAB+); $R_f$=0.84 eluted by chloroform/hexane 1:1.

Elemental analysis:

|   | calc. | found |
|---|---|---|
| C | 81.04 | 81.24 |
| H | 8.17 | 8.18 |
| O | 10.79 | 11.01 |

What is claimed is:

1. A process for the preparation of cyclic phenolic oligomers starting from a phenol at least substituted in the para position and unsubstituted in both ortho positions and a formaldehyde source, comprising the synthesis of at least one linear phenolic oligomer in a basic reaction medium in a first step, and the cyclization of these linear phenolic oligomers in a substantially water-free, neutral or acidic medium in a second step, and wherein the linear oligomers obtained in the first step are not isolated.

2. The process of claim 1, wherein the first step is carried out at a temperature in the range of from 40 to 150° C. and the second step is carried out at a higher temperature of more than 100° C.

3. The process of claim 2, wherein the first step is carried out at a temperature in the range of from 50 to 90° C.

4. The process of claim 1, wherein the reaction medium used in the first step is an aqueous, basic medium containing at least one inorganic or organic base, said reaction medium being neutralized or acidified before or during the second process step.

5. The process of claim 1, wherein an organic liquid immiscible with water and having a boiling point above 100° C. is further added to the reaction mixture obtained in the first step, and water contained and formed in the reaction mixture during the second step is removed therefrom by distillation and decantation.

6. The process of claim 5, wherein said liquid is selected from the group comprising toluene, xylene, tetraline, petrol fractions and diphenyl ether.

7. The process of claim 1, wherein water is removed from the reaction mixture of said first step prior to the preparation of the mixture for the second, cyclization step.

8. The process of claim 1, wherein the neutral or acidic condition of the reaction mixture coming from the first step is established by the introduction of dry HCl gas into said reaction mixture.

9. The process of claim 1, wherein the neutral or acidic condition of the reaction mixture coming from the first step is established by previously loading said organic liquid with dry gaseous hydrochloric acid.

10. The process of claim 1, wherein the number of phenolic units in the linear oligomer is controlled by adjusting the molar ratio between formaldehyde and phenol and/or the reaction time, increased molar ratios and/or higher temperatures and/or longer reaction times resulting in an increase of the number of phenolic units in the linear oligomer obtained and thus also in the final calixarene product.

11. The process of claim 1, wherein p-tert-butylphenol is used as the phenolic starting material.

12. The process of claim 1, wherein p-isopropylphenol is used as the phenolic starting material.

13. The process of claim 1 for the preparation of calixarenes comprising an odd number of phenolic units in their molecules, wherein monomeric, para substituted phenol and, optionally, additional formaldehyde is added to the reaction mixture obtained in the first process step and containing a linear phenolic oligomer comprising an even number of phenolic units in the molecules, and this mixture is then cyclized in the second step.

14. The process of claim 1 for the preparation of calixarenes comprising more than eight phenolic units in their molecules, wherein a linear phenolic oligomer comprising at least five phenolic units in its molecules, is added to the reaction mixture obtained in the first process step and containing a linear phenolic oligomer comprising at least four phenolic units in the molecules, or vice versa, and this mixture is then cyclized in the second step.

15. The process of claim 1, wherein in a further step the para substituent of the phenolic units of the calixarenes obtained in the cyclization step, is removed.

16. The process of claim 1, wherein the first, oligomerization step is carried out under basic conditions in a first reactor, the reaction mixture obtained therein is transferred into a second reactor, additional substances are added thereto if necessary or desired, and the second, cyclization step is then carried out in the second reactor, the mixture being neutralized or acidified before or during the cyclization reaction.

17. Calixarene, wherein the phenolic units are substituted or not, containing more than eight phenolic units in its molecule, the number of these units being even or odd.

18. para-Isopropylcalix[n]arenes wherein n is an integer of at least 4, and their mixtures.

19. p-tert-Butylcalix[z]arenes according to claim 16, wherein z is 11, 12, 13 or 14.

20. p-Isopropyldihomooxacalix[4]arene.

21. Calix[n]arene, wherein the phenolic units are different and n is an integer of at least 5.

* * * * *